United States Patent [19]
Frazier et al.

[11] Patent Number: 5,451,433
[45] Date of Patent: Sep. 19, 1995

[54] PREPARATION OF POLYMERIC DIACETYLENE THIN FILMS FOR NONLINEAR OPTICAL APPLICATIONS

[75] Inventors: Donald O. Frazier, Huntsville; Samuel P. McManus; Mark S. Paley, all of Huntsville; David N. Donovan, Union Grove, all of Ala.

[73] Assignee: The United States of America as represented by the National Aeronautics and Space Administration, Washington, D.C.

[21] Appl. No.: 342,456

[22] Filed: Nov. 18, 1994

[51] Int. Cl.$^6$ ............................................... B05D 3/02
[52] U.S. Cl. .................................. 427/508; 427/164; 427/165; 427/169; 427/264; 427/269; 427/270; 427/272; 427/282; 427/287; 427/385.5; 427/389.7; 427/443.2; 427/510; 427/558; 427/559
[58] Field of Search ............... 427/508, 510, 558, 559, 427/164, 165, 169, 385.5, 389.7, 443.2, 264, 269, 270, 272, 282, 287

[56] References Cited
PUBLICATIONS

*NASA Tech Briefs*—Synthesizing Diacetylenes With Nonlinear Optical Properties May 1993, p. 62, Mark Paley, Samuel McManus, Donald Frazier.
*NASA Tech Briefs*—Films Containing Optically Nonlinear Diacetylene Monomer May 1993, p. 62, Mark Paley, Samuel McManus, Donald Frazier.
*Advanced Coatings & Surface Technology*, Technical Insights, Inc.–Diacetylenes Show Nonlineaer Properties, Sep. 1993, vol. 6, #9 p. 5.

*Primary Examiner*—Bernard Pianalto
*Attorney, Agent, or Firm*—Robert L. Broad, Jr.; Guy M. Miller; Alan J. Kennedy

[57] ABSTRACT

A method for producing polymeric diacetylene thin films having desirable nonlinear optical characteristics has been achieved by producing amorphous diacetylene polymeric films by simultaneous polymerization of diacetylene monomers in solution and deposition of polymerized diacetylenes on to the surface of a transparent substrate through which ultraviolet light has been transmitted. These amorphous polydiacetylene films produced by photo-deposition from solution possess very high optical quality and exhibit large third-order nonlinear optical susceptibilities, such properties being suitable for nonlinear optical devices such as waveguides and integrated optics.

10 Claims, No Drawings

PREPARATION OF POLYMERIC DIACETYLENE THIN FILMS FOR NONLINEAR OPTICAL APPLICATIONS

ORIGIN OF THE INVENTION

The invention described herein was made in the performance of work under a Nasa contract and is subject to the provisions of Section 305 of the National Aeronautics and Space Act of 1958, Public Law 85-568 (72 Star. 453, 42 U.S.C. 2457).

BACKGROUND OF THE INVENTION

1. Field of the Invention

The present invention relates to polymeric diacetylene thin films which are suitable for nonlinear optical applications and their method for preparation. In another aspect the invention relates to photo-deposition of thin polydiacetylene films from solutions of diacetylene monomer that exhibit outstanding third-order optical nonlinearity.

2. Description of Related Art

The development of advanced optical materials that can focus, modulate, multiplex, transmit, receive, demultiplex and demodulate optical signals, will be the key to the realization of economical and reliable optoelectronic systems for optical signal processing and computing applications. Efforts have focused on the development of hybrid and monolithically integrated devices and systems in for example III-V material systems. A number of technological related issues, however, currently impede further progress since III-V semiconductors are incapable of producing the large index modulations that are required to create multiplex phase gratings, which constitute one of several important building block in very large scale optically interconnected systems. In addition, dielectric constants of these materials are dispersive and relatively high when compared with polymeric materials. Further, device yields have been relatively low while cost associated with the growth and processing of related microstructures have been high. Hence the development of new, low cost materials that can be processed into microstructural optical components, will be invaluable to the future optoelectronic integration effort.

The solid state polymerization of diacetylenes has found interest by many in the literature since the nonlinear optical properties of some polydiacetylenes are attractive and third-order NLO properties have been reported. It is also reported that polydiacetylenes are materials with difficulty in processing since the majority are insoluble and infusible, and the materials do not form large single crystals. Presently used methodologies for processing of polydiacetylenes are not simple and are not necessarily suitable for applications and devices. Vapor-phase deposition of some sublimable diacetylenes on quartz plate to obtain crystalline films has been reported. However, polymerizability of diacetylenes depends on their crystalline structures. Polymers of diacetylenes in the molten state can yield amorphous polymer forms whereby the orientation of the polydiacetylenes chains are random.

The polydiacetylenes are of the most interesting materials for optical applications due to their highly conjugated electronic structures. However, they are also difficult materials to be processed into thin films. Various membrane techniques are too complicated for obtaining films for practical uses, and other methods such as vapor deposition are limited to very few particular diacetylenes. The search continues for classes of polydiacetylenes in order to obtain thin films of polydiacetylenes without complex methods of film preparation. Various attempts to disperse homogeneously polydiacetylene crystals in a transparent polymer film does not relieve complexities of forming suitable thin films of polydiacetylenes.

Typically, growth of thin films of polydiacetylenes involve growth of thin crystalline films of diacetylenes monomer followed by topochemical polymerization of these films in the solid-state. This process mostly results in small domains of crystalline polymeric films unacceptable for device applications. The solid-state polymerization production of thin crystalline films of diacetylene is generally achieved by radiation with UV light. One drawback of this technique is that growth of large area monocrystalline thin films possessing high optical quality suitable for devices is not often possible. Thus polydiacetylene thin films are frequently polycrystalline in nature, which renders them translucent or even opaque. Such films greatly undermine their utility for practical applications because of light scattering due to crystal grain boundaries and other defects. In order to be suitable for devices, films with high optical quality, good transparency, minimum scattering centers and the like are required. Clearly an improvement in the existing technology is needed to make monomeric and polymeric diacetylene thin films that can be practical for device applications.

Recent publications surrounding this subject involve use of photopolymerization of a poled polymer to stabilize an orientated polymer against relaxation and loss of good second-order nonlinearity. Other methodologies for production of wave-guiding arrays have been shown to include spin-coting techniques which are also classical methods but involve numerous steps. The spin coating technique produces amorphous thin films and is generally confined to low molecular weights, hence lower optical quality polymers. There are a myriad of papers which discuss the classical methods for providing diacetylene technology for use and devices requiring third-order optical nonlinearity. However, these classical methods lack either efficiency, simplicity and process control which singly or jointly can result in an unsatisfactory product for device usage.

SUMMARY OF THE INVENTION

The present invention presents novel techniques for developing diacetylene thin film applications in the field of nonlinear optics (NLO). The polydiacetylene films are of interest because they are high conjugated polymers capable of exhibiting very large optical nonlinearities with fast response times. On one aspect the present invention provides a methodology for preparing thin amorphous diacetylene films by photo-deposition from solution. These films possess very high optical quality and exhibit large third-order nonlinear optical susceptibilities. The resultant quality and functionality of the amorphous polydiacetylene films so produced provide applications of these thin films for nonlinear optical devices such as waveguides and integrated optics more commercially attractive because of the simplicity of the process and the quality and performance of the resulting product.

The method according to the invention of applying polydiacetylene to the surface of a substrate from a solution provides simultaneous polymerization and deposition of the monomers on the substrate achieved directly from solution and the influence of ultraviolet light. The simultaneous polymerization and deposition on the substrate is achieved by transmitting ultraviolet light through the substrate which is transparent to UV light. In addition, masking experiments in which a portion of the substrate is blocked from exposure of UV light results in the polydiacetylene film forming only where the substrate is directly radiated.

The preparation of polymeric diacetylene thin films for nonlinear optical applications through use of solution-state photo-deposition of thin films along with the utilization of ambient temperature liquid state diacetylene monomers in combination of solvent and post-polymer provides thin films of polymeric diacetylene which exhibit outstanding third-order optical nonlinearity.

DESCRIPTION OF THE PREFERRED EMBODIMENTS

Polydiacetylene thin films have shown great potential as third-order nonlinear optical materials for applications such as 4-wave mixing, third-harmonic generation, phase conjugation, etc. Computer modeling based on semiempirical molecular orbital calculations has been used extensively to predict the chemical and optical properties of diacetylenes as a means of screening potentially interesting compounds. In order to test the viability of various computer models, synthesis, polymerization and characterization several diacetylenes with differing properties were achieved for comparison to the computer predictions.

Long polymeric chains render polydiacetylenes readily conducive to the formation of thin films, thereby making them useful for devices such as waveguides and integrated optics. Hence they have been studied extensively as NLO materials, in particular, as third-order NLO materials. The typical methods for making polydiacetylene thin films involve growth of thin crystalline films of diacetylene monomers, followed by topochemical polymerization of these films in the solid-state to give crystalline polydiacetylene film. One limitation is that epitaxial growth of large-area single crystal thin films is often not possible. Unfortunately, no method exists which is generally applicable to the formation of crystalline polydiacetylene thin films possessing the high optical quality necessary for device applications. The lack of techniques for processing materials readily into usable forms has been one of the chief hindrances to the use of polydiacetylenes (as well as other organics and polymers) for commercial NLO applications.

During the course of crystal growth studies in anticipation of a space experiment, a novel, simple method for the formation of polydiacetylene thin films by photo-deposition from solution onto UV transparent substrates was discovered. A novel technique was developed for preparing thin amorphous polydiacetylene films by photo-deposition from solution. This heretofore unknown process yields films that possess very high optical quality and exhibit large third-order nonlinear optical susceptibilities. Such a simple process for the application of polydiacetylene thin films suitable for nonlinear optical devices such as waveguides and integrated optics increases commercial feasiblity.

For example, a diacetylene monomeric derivative of 2-methyl-4-nitroaniline, DAMNA, was synthesized and characterized. DAMNA sluggishly polymerizes when the crystalline monomer is irradiated. However, thin polydiacetylene (PDAMNA) films can be readily obtained from solutions of DAMNA in 1,2-dichlorethane by irradiation with long wavelength UV light through a transparent window, which serves as the substrate. These UV transparent substrate can be glass, quartz, salt crystals such as sodium chloride and potassium bromide, mica, plastics and the like. These films possess superior optical quality, i.e. greater homogeneity, fewer defects, than those generally obtained via solid-state polymerization. This is primarily because films obtained by means of solid-state polymerization are crystalline, whereas those formed by solution-state polymerization are amorphous. Evidence of this fact is that the refractive index is essentially isotropic, and electron beam diffraction studies indicate no crystal structure. Hence there are no grain boundaries or other crystal defects that can lower the optical quality and cause light scattering. The PDAMNA films obtained by photo-deposition from solution are yellow-orange in color and have thicknesses between 0.5 and 1.0 $\mu$m, which is an ideal range for device applications.

Solution-state photo-deposition process has not been previously reported. It has been found that the ability to form thin films from solution is highly dependent on the monomer structure. Some monomers give little or no thin film deposition despite undergoing polymerization in the bulk solution; the polymer simply precipitates. The parameters controlling the efficacy of thin film formation in solution are not yet totally known.

The role of the substrate in the photo-deposition of these polydiacetylene thin films from solution is also not yet fully understood, however, it is known that it plays an important role. Masking experiments have been conducted in which a portion of the substrate is blocked from exposure to the UV light during film deposition. The mask was not actually in contact with the substrate, but rather was merely placed in front of the substrate to limit exposure to the light. The result is that the polydiacetylene film forms only where the substrate is directly irradiated, even though polymerization still takes place throughout the bulk solution. Clearly, this demonstrates that some process takes place on the substrate itself. Masking has benefits for applications such as the manufacture of integrated optics.

These polydiacetylene films exhibit outstanding third-order NLO properties. Degenerate 4-wave mixing carried out on one such film of PDAMNA (approximately 0.5 $\mu$m thickness), using a pulsed frequency-doubled Nd-YAG laser at 532 nm and 6 ns pulse duration, revealed a large third-order nonlinear susceptibility ($X^{(3)}$) on the order of $10^{-7}$ esu. This excellent value was obtained at a relatively low laser pump energy of 3.3 mJ. Furthermore, qualitative measurements indicate that the response time of the films is on the order of picoseconds, possibly faster, which is consistent with an electronic mechanism for the nonlinearity. Although 532 nm is in the absorption edge of the polymer (which becomes transparent above 650 nm), it is expected that measurements at longer wavelengths away from resonant enhancement (at 604 nm we obtain $X^{(3)}$ values on the order of $10^{-8}$ esu) will also be quite large. These results are quite significant; the largest measured non-reasonant $X^{(3)}$ value to date is on the order of $10^{-9}$ esu for thin films of PTS. The high optical quality of these films gives them great potential for applications in devices. The excellent phase conjugation and fast response time exhibited by the polydiacetylene films could make them useful for applications such as optical switching and optical communications.

What is claimed is:

1. A method for forming thin films of polydiacetylenes from diacetylenes monomers, comprising:

forming a solution of diacetylene monomer and a carrier solvent;

contacting the solution of diacetylene monomer with a first surface of a transparent substrate;

exposing the solution of diacetylene monomer to an ultraviolet light source exposed to a second surface of the substrate;

transmitting the light through the substrate into the solution of diacetylene monomer; and simultaneously polymerizing the diacetylene monomer in solution and depositing said polymerized diacetylene onto the first surface of the substrate.

2. The method according to claim 1 wherein the polydiacetylene thin film formed on the substrate is amorphous.

3. The method according to claim 1 wherein the ultraviolet light source is comprised of relatively long wavelength of from about 350 to 375 nm.

4. The method according to claim 1 wherein the substrate is masked on the second surface of the substrate which blocks a portion of the first surface of the substrate from exposure to the UV light and UV light exposure to the diacetylene monomer solution, approximate to the first surface portion blocking formation of the photo-deposition, polymerized diacetylene polymer in the masked portion.

5. The method according to claim 1 wherein the transparent substrate is comprised of glass.

6. The method according to claim 1 wherein the transparent substrate is comprised of quartz.

7. The method according to claim 1 wherein the transparent substrate is comprised of sodium chloride.

8. The method according to claim 1 wherein the transparent substrate is comprised of potassium bromide.

9. The method according to claim 1 wherein the transparent substrate is comprised of mica.

10. The method according to claim 1 wherein the transparent substrate is comprised of plastics.

* * * * *